United States Patent [19]

Carusillo

[11] Patent Number: 4,542,436
[45] Date of Patent: Sep. 17, 1985

[54] LINEARIZED CAPACITIVE PRESSURE TRANSDUCER

[75] Inventor: Steven J. Carusillo, Elkhart, Ind.

[73] Assignee: Johnson Service Company, Milwaukee, Wis.

[21] Appl. No.: 598,727

[22] Filed: Apr. 10, 1984

[51] Int. Cl.[4] .......................... H01G 7/00; H01G 5/16
[52] U.S. Cl. ........................................ 361/283; 73/718
[58] Field of Search .................... 361/283; 73/718, 724

[56] References Cited

U.S. PATENT DOCUMENTS

| | | | |
|---|---|---|---|
| 3,858,097 | 12/1974 | Polye | 73/724 X |
| 3,952,234 | 4/1976 | Birchall | 73/724 X |
| 4,158,217 | 6/1979 | Bell | 73/718 X |
| 4,227,419 | 10/1980 | Park | 361/283 X |
| 4,392,383 | 7/1983 | Bauerlen et al. | 73/718 X |
| 4,422,125 | 12/1983 | Antonazzi et al. | 361/283 |
| 4,458,537 | 7/1984 | Bell et al. | 73/718 |

*Primary Examiner*—Donald A. Griffin
*Attorney, Agent, or Firm*—Larry L. Shupe; Joseph J. Jochman, Jr.; John P. Ryan

[57] ABSTRACT

A capacitive pressure transducer of the deflecting diaphragm type is adapted to be coupled to a capacitance transducing circuit and includes a generally planar, electrically conductive base member support upon a first insulative substrate. A sensor member is supported upon a second insulative substrate in a generally parallel, spaced relationship from the base member and coacts with the base member to form a sensor capacitor. A reference member is generally coplanar with and in electrical isolation from the sensor member and coacts with the base member to form a reference capacitor. The sensor and reference members each have a plurality of segments interposed one with another. The sensor and reference capacitors have pressure-dependent capacitance values Cs and Cr respectively such that, for discrete pressures selected within an operative range of pressures, the output signals from the transducing circuit will be substantially linear.

A method for making such a deflecting diaphragm type capacitive pressure transducer is also disclosed.

10 Claims, 6 Drawing Figures

LINEARIZED CAPACITIVE PRESSURE TRANSDUCER

This invention relates generally to electrical transducers and more particularly, to a linearized, thermally stable capacitive transducer for providing a voltage output signal as a function of the pressure impressed thereupon.

Capacitive transducers of the diaphragm type are in wide use and, in general, are constructed to provide a measured capacitance, usually transduced to an output voltage by an electronic circuit, which is a function of the pressure impressed upon the transducer. Among the properties important in selecting a capacitive transducer design are linearity and thermal stability. If a transducer has a linear characteristic, changes in output voltage as a function of changes in pressure may be represented by a first order equation and may be portrayed as a straight line when plotted upon a rectilinear graph using Cartesian coordinates. A linear characteristic avoids the necessity of referring to a calibration curve or table to determine the magnitude of the sensed variable as a function of the transducer output. Further, if a transducer is thermally stable, it will be substantially immune to changes in ambient temperature. Lacking stability, a transducer of the capacitive, pressure-sensing type may exhibit a change in capacitance without an attendant change in the impressed pressure and a false reading will result.

One approach to the design of a thermally stable capacitive transducer is shown in U.S. Pat. No. 3,858,097 and includes a pair of opposingly mounted annular plates for providing a reference capacitor and a pair of opposingly mounted central plates for providing a sensor capacitor. Each sensor capacitor plate is coplanar with and internally concentric to its associated reference capacitor plate. Since each coplanar set of reference and sensor plates are formed of identical materials mounted on a common substrate, the transducer tends to exhibit thermal stability characteristics superior to transducers where the reference capacitor is a discrete, externally mounted device. However, the output of such a transducer is nonlinear and requires additional compensation circuitry to be incorporated within the electronic circuit if a linear output is to be obtained.

One solution to the problem of linearization is embodied in the apparatus shown in U.S. Pat. No. 4,227,419 which includes, internal to the sensor, a trimmer capacitor section for offsetting transducer nonlinearities. Since the trimmer capacitors shown therein have surface areas which are much smaller than that of the sensor capacitor, it is required that a large, externally mounted reference capacitor be used therewith in order to obtain a linear output. Because this separately mounted reference capacitor will have an unpredicted temperature coefficient, thermal instability will likely result.

Yet another approach to the design of capacitive pressure transducers is described in U.S. Pat. No. 4,422,125 where the disclosed transducer incorporates a pair of plates maintained in a positional relationship one to the other for providing a reference capacitor, the capacitance value of which is substantially invariable with changes in pressure and temperature. While these transducers have heretofore been satisfactory, they have failed to appreciate the manner in which a capacitive pressure transducer may be constructed as an integral device to exhibit superior thermal stability and, at the same time, lend themselves to transduction by an electronic circuit which thereby has a linear output.

SUMMARY OF THE INVENTION

In general, a capacitive pressure transducer of the deflecting diaphragm type is adapted to be coupled to a capacitance transducing circuit and includes a generally planar, electrically conductive base member supported upon a first insulative substrate. A generally planar, electrically conductive sensor member is supported upon a second insulative substrate in a generally parallel, spaced relationship from the base member. The sensor member coacts with the base member to form a sensor capacitor. An electrically conductive reference member is generally coplanar with and in electrical isolation from the sensor member and coacts with the base member to form a reference capacitor. The sensor and reference members each have a plurality of segments interposed one with another. The sensor and reference capacitors have pressure-dependent capacitance values Cs and Cr respectively such that, for discrete pressures selected within an operative range of pressures, the output signals from the transducing circuit will be substantially linear.

A method for making a deflecting diaphragm type capacitive pressure transducer adapted to be coupled to a capacitive transducing circuit includes the steps of providing a generally planar, electrically conductive base member supported upon a first insulative substrate and providing a second insulative substrate having a generally planar surface adapted to be disposed in a generally parallel, spaced relationship to the base member. A plurality of concentric circles is superimposed upon the planar surface to define a plurality of annular rings. Each of the rings is apportioned into a plurality of sensor incremental areas and a plurality of reference incremental areas. Electrically conductive sensor and reference members are disposed in a continuum upon the sensor and reference incremental areas, respectively, in electrical isolation one from the other and coact with the base member to define sensor and reference capacitors, respectively. Apportioning is performed in a manner so that the sensor and reference capacitors have pressure dependent capacitance values such that for pressures occurring within an operative range, the output signals from the transducing circuit will be substantially linear.

It is an object of the present invention to provide a capacitive transducer which exhibits both linear and thermally stable characteristics.

Another object of the present invention is to provide a capacitive pressure transducer with sensor and reference members, each having a plurality of segments interposed one with another.

Yet another object of the present invention is to provided a capacitive pressure transducer having both sensor and reference capacitors incorporated within a single structure.

Still another object of the present invention is to provide a capacitive transducer wherein its sensor and reference capacitors have pressure-dependent capacitance values such that, for discrete pressures selected within an operative range of pressures, the output signals from a transducing circuit will be substantially linear.

Another object of the present invention is to provide a capacitive pressure transducer wherein the sensor and reference capacitors have pressure-dependent capacitance values such that, for discrete pressures selected within an operative range of pressures, the output signals from the transducing circuit may be represented by a substantially straight line upon a rectilinear graph using Cartesian coordinates. How these and other objects of the invention are accomplished will become more apparent from the following detailed description taken in conjunction with the drawing.

DESCRIPTION OF A PREFERRED EMBODIMENT

Figure 1:
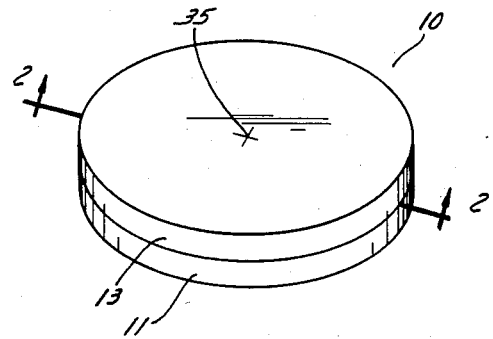
FIG. 1 is an isometric view of a diaphragm-type capacitive pressure transducer constructed in accordance with a preferred embodiment of the invention.
Figure 2:
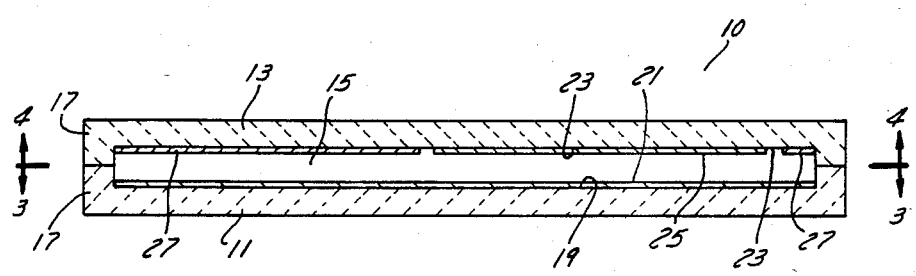
FIG. 2 is a side elevation view of the inventive transducer taken along the plane 2—2 of FIGS. 1 and 4.

As shown in FIGS. 1, 2, 3 and 4, the capacitive pressure transducer 10 of the present invention is shown to include a first dielectric substrate or body 11 and a second dielectric substrate or body 13 attached one to the other and defining a cavity 15 therebetween. Each body 11, 13 includes an annular shoulder 17 projecting therefrom to permit attachment one to the other in an opposing relationship. The materials from which the bodies 11, 13 are formed and the selected thicknesses of the materials will depend upon the manufacturing cost parameters to be achieved and the magnitude of the pressures to be transduced, among other factors. However, preferred body materials include alumina ceramic and quartz. The first body 11 includes a first surface 19 for supporting a base member 21 disposed thereon while the second body 13 includes a second surface 23 for supporting the sensor and reference members, 25, 27 respectively, disposed thereon. In a preferred transducer 10, the surfaces 19, 23 are substantially flat and parallel one to the other when the bodies 11, 13 are assembled. While certain manufacturing economies may result if the bodies 11, 13 are identically configured, it will be appreciated by those of ordinary skill that either the first or the second body, 11 or 13, may include a shoulder having a projecting height equivalent to the desired spacing between the base member 21 on one hand and the sensor and reference members 25 and 27 on the other. The other body may then simply be formed as a disk. As other alternatives, disk-shaped substrates may be joined by the use of glass frits, spacing disks or by other known means.

Figure 3:
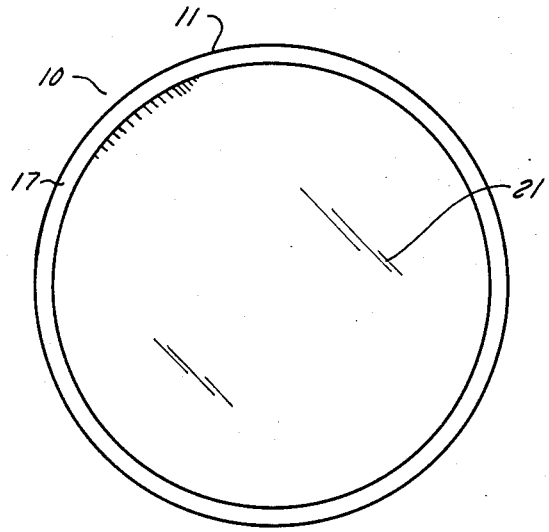
FIG. 3 is a top plan view in full representation of the first substrate of the transducer of FIG. 1 taken along the plane 3—3 of FIG. 2.
Figure 4:
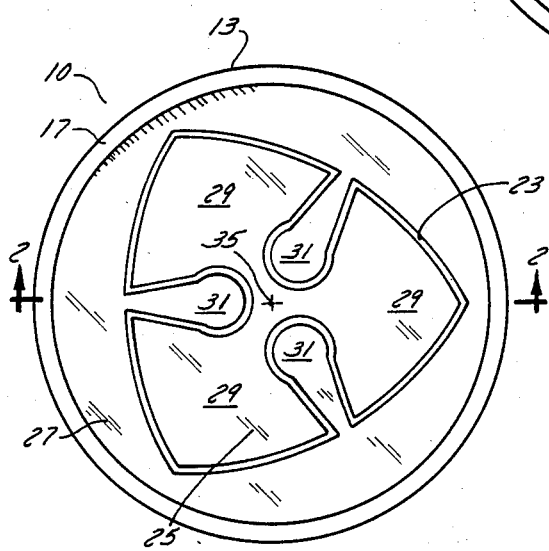
FIG. 4 is a bottom plan view in full representation of the second substrate of the transducer of FIG. 1 taken along the plane 4—4 of FIG. 2.

Referring particularly to FIGS. 3 and 4, a generally planar, electrically conductive base member 21 is disposed upon the first surface 19 of the first body 11 and a generally planar, electrically conductive sensor member 25 is disposed upon the second surface 23 in a manner to be generally parallel to and in spaced relationship from the base member 21. The sensor member 25 may thereby coact with the base member 21 to form a sensor capacitor. Similarly, an electrically conductive reference member 27 is disposed upon the second surface 23 and may thereby coact with the base member 21 to form a reference capacitor. The sensor and reference members, 25 and 27 respectively, each have a plurality of segments, 29 and 31 respectively, which are interposed one with the other. As will be apparent from a reading of the description following, the view of FIG. 4 illustrates one of many possible configurations of the sensor and reference members 25 and 27, the geometry of which will be governed by the characteristics of the separate electronic tranducing circuit which is used to generate a voltage output signal, the latter being a function of the capacitances of the sensor and reference capacitors.

A useful and highly accurate electronic circuit for transducing the capacitances of the sensor and reference capacitors is shown in my co-pending application Ser. No. 06/532,017 filed on Sept. 14, 1983, entitled "Apparatus And Method For Determining The Value Of A Capacitance" and which is assigned to the same assignee as this invention. The aforementioned application is incorporated herein by reference. The dual oscillator type electronic transducing circuit as shown in that application has an average D.C. voltage output which has a relationship to the capacitances of the sensor and reference capacitors in accordance with the equation $$\text{Vout } (P) = \frac{Cs\ (P)}{Cs\ (P) + Cr\ (P)} \times \text{Vsup}$$

wherein Vout is the average D.C. output voltage of the electronic circuit, Vsup is the substantially constant circuit supply voltage, Cs is the capacitance of the sensor capacitor, Cr is the capacitance of the reference capacitor and Vout, Cs and Cr are functions of the pressure impressed upon the transducer as denoted by the (P) symbol adjacent each of those terms. This formula may be termed the characteristic operating equation for the dual oscillator capacitance-to-voltage transducing circuit shown in the aforementioned application.

Capacitance-to-voltage transducing circuits having other configurations may and likely will have other characteristic operating equations and the manner of constructing a thermally stable capacitive transducer to permit a linear output from any one of a wide variety of such circuits will now be described.

Figure 5:
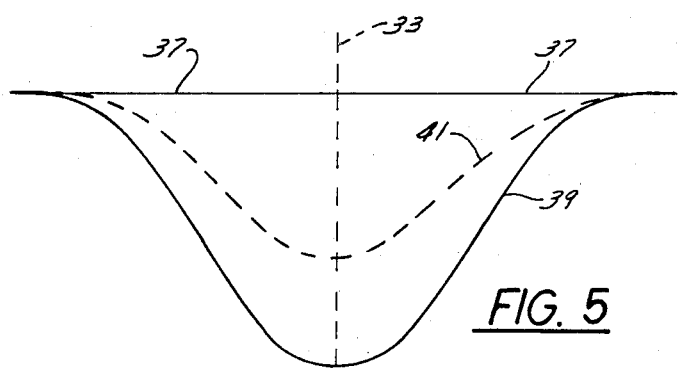
FIG. 5 is a qualitiative graphical representation generally depicting the magnitudes of deflection of a pressure-sensing diaphragm, at described portions.

With capacitive transducers of the deflecting diaphragm type, it is known that those portions of the diaphragm, the second dielectric body 13 in the present invention, which are closer to diaphragm center will have a magnitude of deflection greater than those portions near the diaphragm edge for any pressure which is uniformly impressed across the diaphragm surface. This characteristic is qualitatively represented by the graph of FIG. 5 wherein the dashed vertical axis 33 represents the center point 35 of the second body 13 defining the diaphragm while the lateral regions 37 of the graph represents those portions nearer the supportive shoulders 17. The solid line curve 39 represents the maximum magnitudes of diaphragm deflection for a maximum pressure to be sensed while the dashed curve 41 represents magnitudes of deflection for an intermediate pressure. The representations are greatly enlarged for clarity and it should be understood that the maximum deflection at the diaphragm center 35 may be only a few thousandths of an inch.

With a transducer of the type shown in U.S. Pat. No. 3,858,097, it is apparent that for a given impressed pressure, the change in capacitance of the sensor capacitor is much greater than that for the reference capacitor. This is so since the annular plates defining the reference capacitor are disposed closely adjacent to the supportive shoulder while those plates which form the sensor capacitor are disposed nearer diaphragm center, the area of maximum deflection. With a transducer 10 of the inventive type, the configuration of the members 25, 27, defining portions of the reference and the sensor capacitors respectively, is accomplished in view of the characteristic operating formula of the particular transducer circuit to be employed so that the output signals therefrom will be substantially linear.

Figure 6:
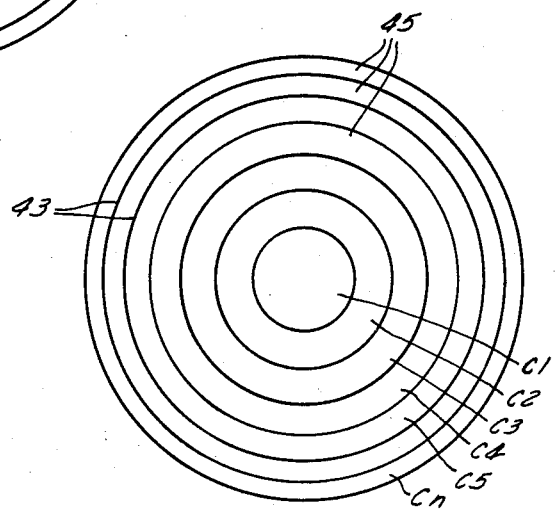
FIG. 6 is a graphical representation including a plurality of incentive circles superimposed upon a substrate in accordance with the description herein included.

Referring to FIG. 6, configuration is by superimposing a plurality of concentric circles 43 upon the planar surfaces 19, 23 of the first and second insulative substrates 11, 13, thereby defining a plurality of opposing annular rings 45 upon each substrate 11, 13. Each of the rings 45 superimposed upon substrate 13 is apportioned into a plurality of sensor incremental areas and a plurality of reference incremental areas. The apportioning step is performed in a manner so that the sensor and reference capacitors have pressure dependent capacitance values such that, for discrete pressures selected within an operating range of pressures, the output signals from the transducing circuit will be substantially linear. An electrically conductive sensor member 25 is disposed in a continuum upon the sensor incremental areas while an electrically conductive reference member 27 is disposed in a continuum upon the reference incremental areas and in electrical isolation from the sensor member 25. The sensor member 25 and the reference member 27 may then coact with the base member 21 to define a sensor capacitor and a reference capacitor, respectively. The actual task of defining the geometry of the sensor and reference members 25, 27 is accomplished by the use of finite element analysis and the application of optimization theory and in view of the characteristic operating equation for the particular transducing circuit being used.

Apportioning of each ring 45 as defined by any two adjacent circles 43 is by equations selected in view of the characteristic operating formula of the transducing circuit to be employed. With respect to the characteristic operating formula set out above, the first apportioning equation will be:

$$Cs(P) = \sum_{i=1}^{N} FiCi(P)$$

where Cs(P) is equal to the value of the sensor capacitor as a function of pressure, Ci(P) is equal to the capacitance value of each pair of opposing rings 45 as a function of pressure, Fi is equal to the fraction of the ith ring 45 which is a portion of the sensor capacitor and N is equal to the total number of rings 45. The second apportioning equation is:

$$Cr(P) = \sum_{i=1}^{N} (1 - Fi)Ci(P)$$

where Cr(P) is equal to the value of the reference capacitor as a function of pressure.

In the preferred embodiment of the transducer 10 most useful with the circuit disclosed in the aforementioned incorporated application, the areas of all rings 45 are equal one to the other and the area of each ring 45 is apportioned in a manner such that the conditions of the following formula are met:

$$\sum_{i=1}^{N} Fi = \frac{N}{2}$$

It should be appreciated that this formula is based upon the first and second apportioning equations which are, in turn, based upon the characteristic operating equation set forth above. It should be further appreciated that when the aforementioned conditions are met, the capacitances of the reference capacitor and the sensor capacitor will be equal one to the other when no external pressure is impressed upon the transducer 10. If it is assumed that a plurality of concentric rings 45 identical to those shown in FIG. 6 is superimposed upon the base member 21, it is apparent that the capacitance of each pair of opposingly facing rings 45 is identical one to the other when no external pressure is impressed upon the transducer 10. This is a preferred feature when using the transducer circuit described in the aforementioned application as it will result in a 50% duty cycle output signal, the pickup instrument of which may be easily calibrated for psig impressed upon the transducer 10. It should be appreciated that superimposition of the concentric circles 43 shown in FIG. 6 and described above is an analytical design step and that these circles 43 do not appear in the finished product.

The embodiment of FIG. 4 is one of many possible configurations of the sensor and reference members 25, 27 which may be accomplished using the aforementioned circuit characteristic operating equations and the proportioning equations set out above.

Notwithstanding the fact that a diaphragm type capacitive pressure transducer 10 may be configured to have any one of a variety of shapes for the sensor and reference members 25, 27, a characteristic shared by a large number of these configurations is that their sensor members 25 and their reference members 27 will each have a plurality of segments 29, 31 interposed one with the other in the manner shown in FIG. 4. Whie one may configure sensor and reference members 25, 27 to have but a single interposed segment, the use of a plurality of segments will aid in the reduction or elimination of errors which may otherwise result from, for example, non-parallelism of the surfaces 19 and 23.

While only a single preferred transducer 10 and method have been shown and described herein, the invention is not intended to be limited thereby but only by the scope of the claims which follow.

I claim:

1. A capacitive pressure transducer adapted to be coupled to a capacitance transducing circuit and including;
   a generally planar, electrically conductive base member supported upon a first insulative substrate;
   a generally planar, electrically conductive sensor member supported upon a second insulative substrate in generally parallel, spaced relationship to said base member and coacting therewith to define a sensor capacitor;
   an electrically conductive reference member disposed generally coplanar with and in electrical isolation from said sensor member and coacting with said base member to define a reference capacitor;

said sensor and reference members being configured in view of the characteristic operating equation of said transducing circuit and each having a plurality of segments interposed one with the other;

said sensor and reference capacitors having pressure-dependent capacitance values such that for discrete pressures selected within an operative range of pressures, the output signals from said transducing circuit will be substantially linear.

2. The invention set forth in claim 1 wherein said sensor member and said reference member each include at least three segments.

3. The invention set forth in claim 2 werein the number of segments of said sensor member and said reference member are equal one to the other.

4. The invention set forth in claim 3 wherein the capacitance of said sensor capacitor and the capacitance of said reference capacitor are substantially equal one to the other when said capacitive pressure transducer is at a pressure of zero pounds per square inch gauge.

5. The invention set forth in claim 2 wherein said sensor member defines a first surface area, said reference member defines a second surface area and said first surface area and said second surface area are substantially equal one to the other.

6. The invention set forth in claim 1 wherein the capacitance of said sensor capacitor and the capacitance of said reference capacitor are substantially equal one to the other when said capacitive pressure transducer is at a pressure of zero pounds per square inch gauge.

7. A method for making a deflecting diaphragm type capacitive pressure transducer adapted to be coupled to a capacitance transducing circuit, said method including the steps of:

providing a generally planar, electrically conductive base member supported upon a first insulative substrate;

providing a second insulative substrate having a generally planar surface adapted to be disposed in a generally parallel, spaced relationship to said base member;

superimposing a plurality of concentric circles upon said planar surface to define a plurality of annular rings;

apportioning each of said rings into a plurality of sensor incremental areas and a plurality of reference incremental areas;

providing an electrically conductive sensor member disposed in a continuum upon said sensor incremental areas and coacting with said base member to define a sensor capacitor;

providing an electrically conductive reference member disposed in a continuum upon said reference incremental areas and in electrical isolation from said sensor member, said reference member coacting with said base member to define a reference capacitor;

said apportioning step being performed in view of the characteristic operating equation of said transducing circuit and in a manner so that said sensor and reference capacitors have pressure dependent capacitance values such that for discrete pressures selected within an operative range of pressures, the output signals from said transducing circuit will be substantially linear.

8. The invention set forth in claim 7 wherein said sensor member and said reference member each have a plurality of segments interposed one with the other.

9. The invention set forth in claim 8 wherein the capacitance of said sensor capacitor and the capacitance of said reference capacitor are substantially equal one to the other when said capacitive pressure transducer is at a pressure of zero pounds per square inch gauge.

10. The invention set forth in claim 9 wherein said capacitance transducing circuit has as its characteristic operating formula the equation $$V_{out} = \frac{C_s(P)}{C_s(P) + C_r(P)} \times V_{sup}$$

where Vout is the average DC output voltage of said circuit, $C_s(P)$ is the capacitance of said sensor capacitor as a function of pressure, $C_r(P)$ is the capacitance of said reference capacitor as a function of pressure and Vsup is the supply voltage of said transducing circuit.

* * * * *

UNITED STATES PATENT OFFICE
CERTIFICATE OF CORRECTION

PATENT NO. : 4,542,436
DATED : September 17, 1985
INVENTOR(S) : Carusillo, Steven J.

It is certified that error appears in the above-identified patent and that said Letters Patent are hereby corrected as shown below:

Abstract, line 4 "support" should be --supported--

Column 2, line 57 "provided" should be --provide--

Column 3, line 23 "qualitiative" should be --qualitative--

Column 4, line 14 "tranducing" should be --transducing--

Column 4, line 62 "represents" should be --represent--

Column 6, line 46 "Whie" should be --While--

Column 7, line 16, line 1 of Claim 3 "werein" should be --wherein--

Signed and Sealed this

Twenty-first Day of January 1986

[SEAL]

Attest:

DONALD J. QUIGG

Attesting Officer     Commissioner of Patents and Trademarks